US010660312B2

(12) United States Patent
Leach et al.

(10) Patent No.: US 10,660,312 B2
(45) Date of Patent: May 26, 2020

(54) ANTI-PULL COLLAR ATTACHMENTS FOR USAGE WITH ANIMAL COLLARS

(71) Applicant: Ideaphant, LLC, Phoenix, AZ (US)

(72) Inventors: Justin James Leach, Phoenix, AZ (US); Leif Strom, Scottsdale, AZ (US)

(73) Assignee: Ideaphant, LLC, Phoenix, AZ (US)

( * ) Notice: Subject to any disclaimer, the term of this patent is extended or adjusted under 35 U.S.C. 154(b) by 149 days.

(21) Appl. No.: 15/657,032

(22) Filed: Jul. 21, 2017

(65) Prior Publication Data

US 2018/0168128 A1    Jun. 21, 2018

Related U.S. Application Data

(60) Provisional application No. 62/435,966, filed on Dec. 19, 2016.

(51) Int. Cl.
*A01K 15/04*    (2006.01)
*A01K 27/00*    (2006.01)
*A01K 15/02*    (2006.01)

(52) U.S. Cl.
CPC ............ *A01K 15/04* (2013.01); *A01K 15/02* (2013.01); *A01K 27/001* (2013.01)

(58) Field of Classification Search
CPC ........ A01K 15/00; A01K 15/02; A01K 15/04; A01K 27/001; A01K 15/022; A01K 15/029; A01K 27/005; A01L 15/04; A01L 27/001
USPC ....... 119/856, 858, 862, 712, 769, 792, 962, 119/964
See application file for complete search history.

(56) References Cited

U.S. PATENT DOCUMENTS

| | | | | |
|---|---|---|---|---|
| 2,394,144 A * | 2/1946 | Brose | ................... | A01K 27/001 119/862 |
| 3,608,524 A * | 9/1971 | Waltz | ................... | A01K 15/022 119/718 |
| 4,180,013 A * | 12/1979 | Smith | ................... | A01K 15/022 119/718 |
| 4,940,020 A * | 7/1990 | Gordon | ................ | A01K 27/001 119/802 |
| 6,101,980 A * | 8/2000 | Davies-Ross | ........ | A01K 27/001 119/856 |
| 9,326,489 B2 * | 5/2016 | Ritzdorf | ................ | A01K 27/001 |
| 2003/0150402 A1 * | 8/2003 | Muller | ................... | A01K 15/02 119/856 |
| 2011/0132275 A1 * | 6/2011 | Huo | ...................... | A01K 15/021 119/720 |

(Continued)

*Primary Examiner* — Christopher D Hutchens

(57) ABSTRACT

Embodiments of an anti-pull collar attachment are provided. In one embodiment, the anti-pull collar attachment includes a collar attachment interface having a collar guideway through which a segment of an animal collar is routed to removably mount the collar attachment to the animal collar. A first prodding feature is coupled to the collar attachment interface and, when the anti-pull collar attachment is removably mounted to the animal collar, is positioned beneath the segment of the animal collar. The prodding feature engages into an animal wearing the animal collar when a pull force is exerted on the collar. In certain implementations, the anti-pull collar attachment further includes a frame coupled to the collar attachment interface, as well as a movable platform slidable with respect to the frame along a prodding axis. The first prodding feature projects from the movable platform and moves in conjunction therewith along the prodding axis.

18 Claims, 6 Drawing Sheets

(56) References Cited

U.S. PATENT DOCUMENTS

| | | | |
|---|---|---|---|
| 2011/0203529 A1* | 8/2011 | Mainini | A01K 27/009 119/712 |
| 2017/0000086 A1* | 1/2017 | Fletcher | A01K 27/001 |
| 2019/0133084 A1* | 5/2019 | Landers | A01K 15/023 |
| 2019/0246607 A1* | 8/2019 | Chen | A01K 27/001 |

* cited by examiner

ANTI-PULL COLLAR ATTACHMENTS FOR USAGE WITH ANIMAL COLLARS

RELATED APPLICATION(S)

This application claims priority to provisional U.S. Patent Application Ser. No. 62/365,888, filed with the USPTO on Jul. 22, 2016, the entire contents of which are hereby incorporated by reference.

TECHNICAL FIELD

The present invention relates generally to animal training aids and, more particularly, to anti-pull collar attachments, which can be removably attached to an animal collar by a user to deter excessive pulling by dog or other animal wearing the collar.

BACKGROUND

Anti-pull training aids discourage an animal, typically a dog, from pulling excessively on a leash through a collar worn by the animal; the term "collar," as appearing herein, defined to encompass neck-worn collars, as well as other animal-worn attachment devices or tethers, such as body harnesses and head halters. Several different types of anti-pull training aids have been developed and are presently commercially marketed. Aversion collars, for example, are a specialized type of neck-worn collar designed to produce an unpleasant physical sensation, such as localized pinching, prodding, or choking, when subject to excessive pulling. A well-known example of an aversion collar, now widely discouraged from use, is a choke collar. Other examples of aversion collars include prong collars, force collars, shock collars, pinch collars, and limited slip collars. Though less common, certain discrete devices that attach between a collar and a leash have also been developed to deter excessive pulling by a dog. For example, certain noise-generating devices attempt to deter excessive pulling by generating an unpleasant or distracting sound (e.g., a loud whistling noise) when triggered by a threshold tensile force. Finally, another common approach for countering excessive pulling by a dog is through the usage of a body harness or head halter; again, considered a type of "collar" in the context of the present document. Such harnesses and halters physically prevent excessive pulling or, alternatively, dissuade excessive pulling by exerting an uncomfortable pressure against a dog's chest, shoulder, hindquarter, or leg regions when subject to pulling.

The aforementioned anti-pull training aids remain limited in certain regards. Many can be challenging to properly position on a dog or other animal, difficult to remove, or are otherwise cumbersome to use. Others, such as choke collars and limited slip collars, are potentially harmful to an animal. Still other anti-pull training aids tend to be ineffective at discouraging excessive pulling in many scenarios. For example, while attached to and detached from a collar with relative ease, the above-described noise-generating devices are frequently ineffective at discouraging excessive pulling by highly active, aggressive, or untrained dogs. There thus exists an ongoing demand for improved anti-pull training aids, which are relatively effective at discouraging an animal from excessive pulling behaviors and which otherwise overcome the limitations listed above. Other desirable features and characteristics of the present invention will become apparent from the subsequent Detailed Description and the appended Claims, taken in conjunction with the accompanying Drawings and the foregoing Background.

BRIEF DESCRIPTION OF THE DRAWINGS

At least one example of the present invention will hereinafter be described in conjunction with the following figures, wherein like numerals denote like elements, and.

DETAILED DESCRIPTION

Figure 1:
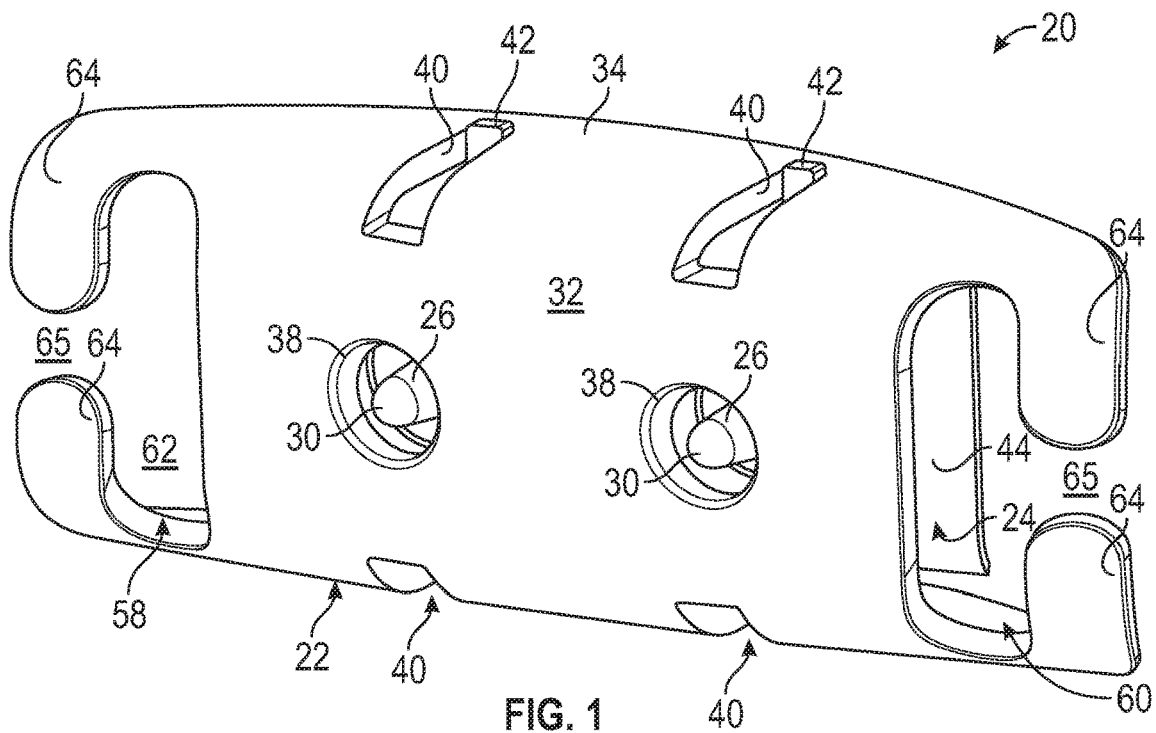
FIGS. 1, 2, 3, and 4 are front isometric, rear isometric, front, and side views, respectively, of an anti-pull collar attachment in a retracted, non-pinching state, as illustrated in accordance with a first exemplary embodiment of the present disclosure.
Figure 2:
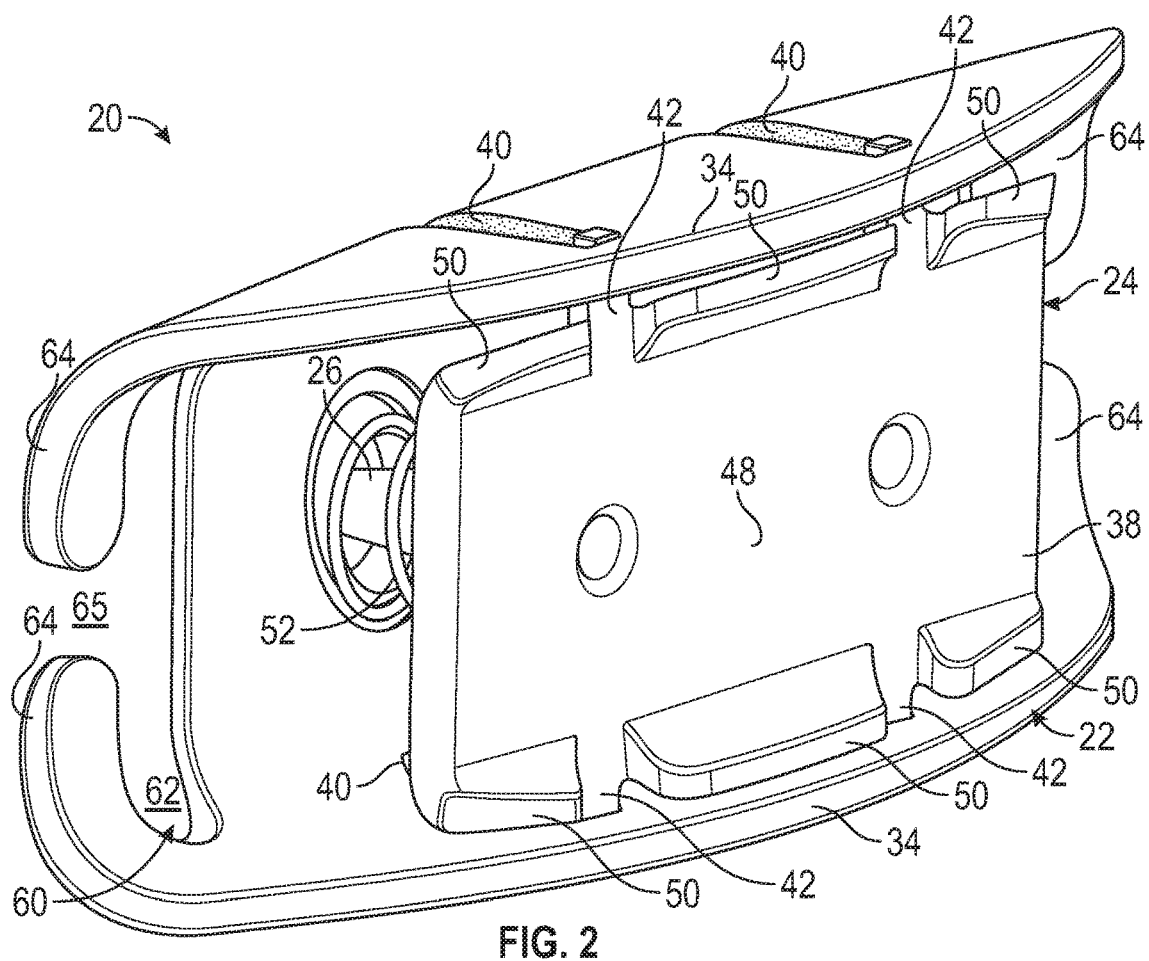

The following Detailed Description is merely exemplary in nature and is not intended to limit the invention or the application and uses of the invention. The term "exemplary," as appearing throughout this document, is synonymous with the term "example" and is utilized repeatedly below to emphasize that the following description provides only multiple non-limiting examples of the invention and should not be construed to restrict the scope of the invention, as set-out in the Claims, in any respect.

The following describes embodiments of an anti-pull collar attachment, which can be attached to a collar worn by an animal to discourage the animal from engaging in excessive pulling behaviors. It is anticipated that the anti-pull collar attachment will often be utilized in conjunction with a collar worn around the neck of a dog; thus, embodiments of the anti-pull collar attachment are primarily described below in this context. It is emphasized, however, that the anti-pull collar attachment can be utilized in conjunction with any type of animal-worn collar, without limitation, including neck-worn collars, body harnesses, head halters, and other such animal-leash attachment devices. Embodiments of the anti-pull collar attachment include one or more prodding features, as well as a collar attachment interface. The collar attachment interface can assume any form suitable for allowing the anti-pull collar attachment to be removably installed on a collar by a user, usefully in a manner locating the prodding features underneath the collar. The prodding features are designed to produce an unpleasant, aversive tactile sensation as the prodding feature engage into (e.g., press against) a region of the animal when a pull force is exerted through the collar. The aversive tactile sensation can be a poking sensation, a pinching sensation (also considered "prodding" in the context of the present document), or another sensation sufficient to discourage the animal from engaging in continued or increasingly forceful pulling behaviors.

Depending upon the manner in which the anti-pull collar attachment is implemented, the prodding features may or may not lightly or gently engage the animal when a pull force is not exerted through the collar. For example, in certain embodiments, the prodding features may be movable with respect to at least one guard member, such as forward wall or leading fascia of the collar attachment housing, which contacts or rests against the animal's exterior when the anti-pull collar attachment is installed on an animal-worn collar. In this case, the prodding features may be resiliently biased toward a retracted position in which the prodding features are partially or fully recessed relative to the guard member. As a pull force or tensile force is exerted through the collar on which the collar attachment is installed, a compressive force is applied across the anti-pull collar attachment. This compressive force may act on the guard member in a direction away from the exterior of the animal and/or act on the prodding features in a direction toward the animal. When the pull force exerted through the collar and, therefore, the compressive force exerted across the anti-pull collar attachment is sufficiently pronounced, the prodding features advance toward the animal relative to the guard member to generate the desired aversive sensation by, for example, pressing into the animal and/or converging in a pinching motion.

In certain embodiments, the anti-pull collar attachment may provide a multistage deterrent effect. In this case, the aversive effect produced by the collar attachment increases in intensity a stepwise fashion as the compressive force exerted across the collar attachment increases. For example, in one embodiment, the anti-pull collar attachment may include prodding posts, which initially engage into the animal without pinching in response to a first compressive force exerted across the collar attachment; and which further engage into the animal and converge in a pinching motion in response to a second compressive force greater than the first compressive force. Finally, in certain embodiments, the anti-pull collar attachment may include a user feedback interface, which generates a user-perceptible sound and/or a user-perceptible vibrational response as the collar attachment is actuated or triggered. An exemplary embodiment of the anti-pull collar attachment will now be described in conjunction with FIGS. 1-6.

FIGS. 1, 2, 3, 4, and 5 are front isometric, rear isometric, front, side, and cross-sectional views, respectively, of an anti-pull collar attachment 20, as illustrated in accordance with an exemplary embodiment of the present disclosure. Anti-pull collar attachment 20 includes an outer housing, cover, shell, or frame 22 to which a movable platform 24 is slidably attached. Two prodding features 26 project from movable platform 24 in a forward direction; the term "forward" referring to a direction toward a dog or other animal wearing a collar to which anti-pull collar attachment 20 is attached and, specifically, toward a region of the animal underlying the collar and contacted by collar attachment 20. The term "aft" is further utilized herein to refer to a direction opposite the forward direction. The forward and aft directions are labeled in FIG. 4 for added clarity. Movable platform 24 and prodding features 26 are produced as a single (e.g., injection molded) piece in the illustrated embodiment and may thus be collectively referred to as "molded piece 24, 26" herein. In further embodiments, movable platform 24 and prodding features 26 may be produced as separate pieces, which are assembled or joined in some manner during manufacture of collar attachment 20.

Prodding features 26 move in conjunction with movable platform 24 relative to frame 22 along a prodding axis. The prodding axis is identified in FIG. 4 by double-headed arrow 28 and generally corresponds with the centerline of anti-pull collar attachment 20. Movable platform 24 and prodding features 26 are movable along prodding axis 28 between a retracted position (shown in FIGS. 1-4) and a fully extended position (shown in FIG. 5). Prodding features 26 each include a tip portion or a leading terminal end 30 (identified in FIGS. 1, 5, and 7). As movable platform 24 and prodding features 26 transition from the retracted position (FIGS. 1-4) to the extended position (FIG. 5), leading terminal ends 30 of prodding features 26 advance relative to frame 22 along prodding axis 28 in a forward direction. When anti-pull collar attachment 20 is installed on an animal-worn collar, leading terminal ends 30 of prodding features 26 increasingly engage into the animal as prodding features 26 and movable platform 24 move into the extended position (FIG. 5). In so doing, prodding features 26 generate an aversive or unpleasant tactile sensation experienced by the animal. Further description in this regard is provided below in conjunction with FIGS. 8 and 9. First, however, a more detailed discussion of the structural features and general construction of anti-pull collar attachment 20 will be provided, again emphasizing that collar attachment 20 is merely an example of one potential implementation of the present invention.

Frame 22 can be produced from any number of pieces or components, which can be joined utilizing fasteners, adhesive, welding, interference fit, heat staking, or in various other manners. In certain embodiments, frame 22 may include one or more metal pieces, such as a metal plate that is stamped, etched, laser cut, water jetted, or otherwise machined or formed to include the below-described collar mount features. In the illustrated example, frame 22 is produced as a single injection molded piece. Similarly, movable platform 24 and prodding features 26 can have various different constructions. In certain embodiments, and as noted above, movable platform 24 and prodding features 26 can be produced as separate components and assembled during manufacture of anti-pull collar attachment 20. For example, movable platform 24 may be produced to include threaded openings that matingly receive externally-threaded base portions of prodding features 26 (when assuming the form of posts or pillars) in a manner similar to the removable cleat of a sports shoe. Advantageously, such an interface may also permit different versions of prodding features 26 to be exchanged as desired to, for example, allow customization of the intensity of the aversive effect generated by prodding features 26. Alternatively, as shown in FIGS. 1-5, previously noted, and provided by way of non-limiting example only, prodding features 26 and movable platform 24 may be produced as a single injection molded piece 24, 26.

Figure 3:
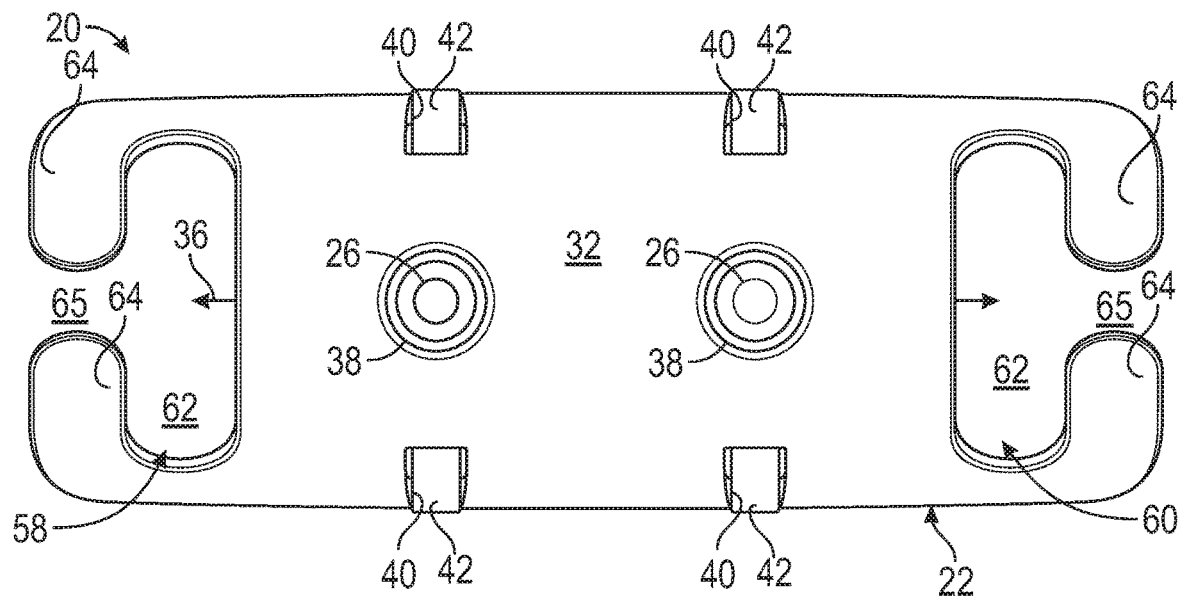
Figure 5:
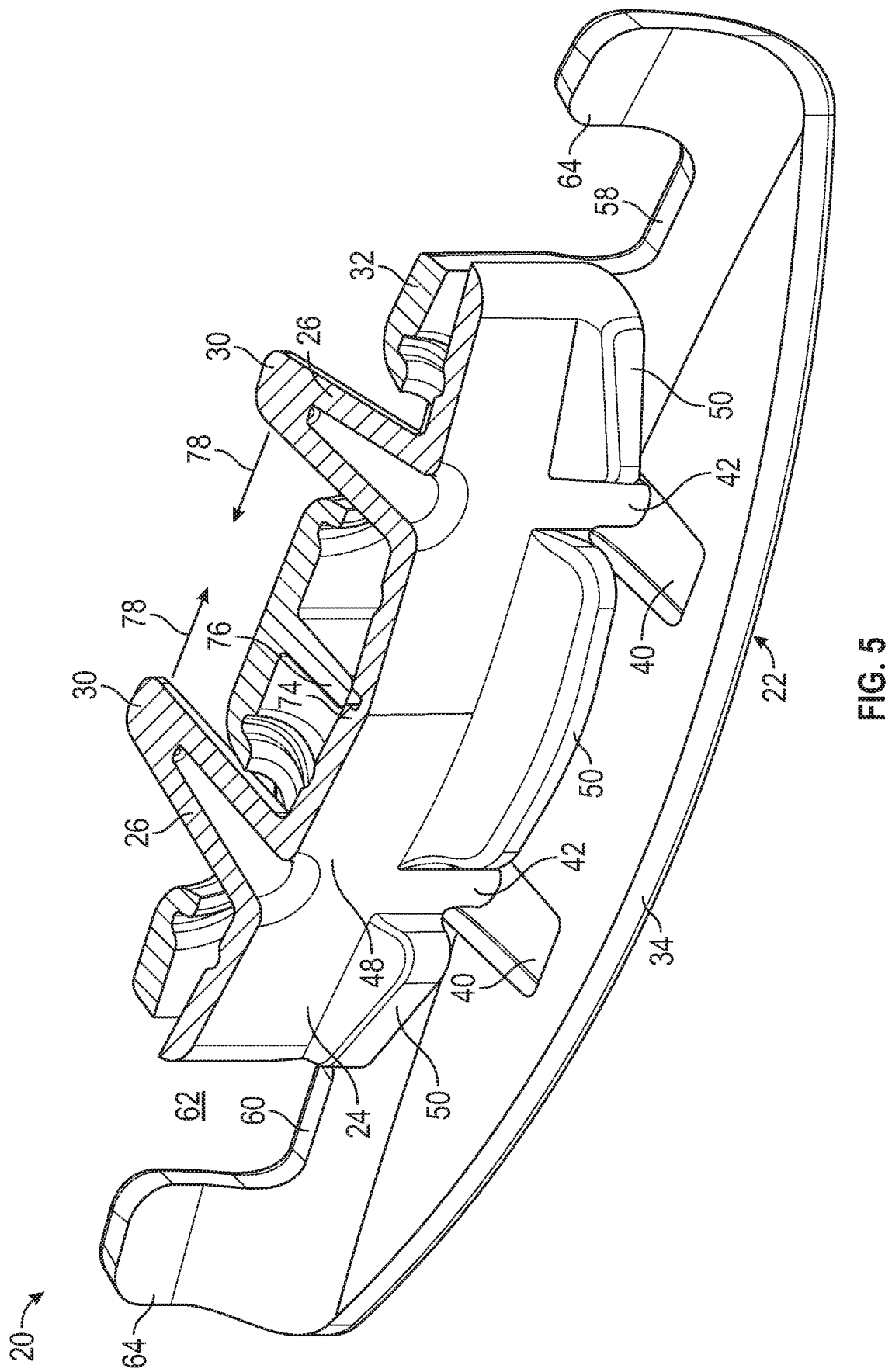
FIG. 5 is a cross-sectional view of the exemplary anti-pull collar attachment shown in FIGS. 1-4 in an extended, pinching state.
Figure 6:
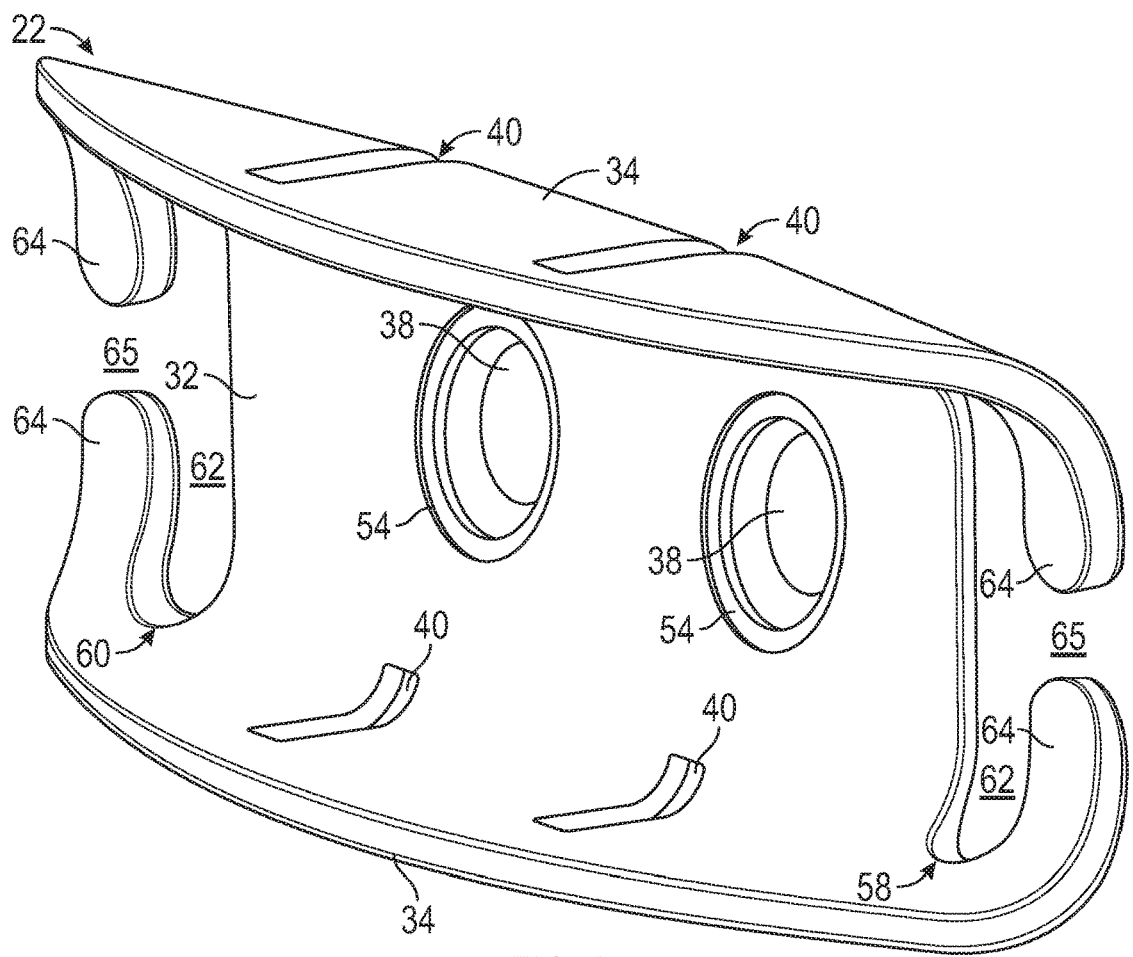
FIG. 6 is a rear isometric view illustrating a frame included in the anti-pull collar attachment shown in FIGS. 1-5 and defining, at least in part, a collar attachment interface.

FIG. 6 illustrates frame 22 in isolation, as seen from a rear isometric view. Referring collectively to FIGS. 1-6, frame 22 includes a leading or forward wall 32 and two trailing flanges 34, which are coupled to (e.g., integrally formed with) forward wall 32. Forward wall 32 may be oriented substantially orthogonal to prodding axis 28 in an embodiment. Flanges 34 project from opposing longitudinal edges of forward wall 32. Specifically, utilizing the terms "upper" and "lower" in a non-limiting sense with respect to the illustrated orientation of frame 22 shown in FIGS. 1-6, flanges 34 project from the upper and lower edges of forward wall 32 in an aftward direction. As is frame 22 generally, flanges 34 are elongated as taken along the longitudinal axis of anti-pull collar attachment 20, which is represented in FIG. 3 by double-headed arrow 36. Flanges 34 may each have a substantially arc-shaped planform geometry such that the flange height (as measured along centerline or prodding axis 28) gradually decreases or tapers downward when moving away from the middle portion of each flange 34 toward either end of each flange 34. Collectively, forward wall 32 and flanges 34 impart frame 22 with a substantially U-shaped geometry when viewed from an end of frame 22 along longitudinal axis 36. Frame 22 thus wraps around or surrounds movable platform 24 on three sides in the illustrated embodiment, while movable platform 24 is nested or housed within frame 22. Additionally, frame 22 and movable platform 24 combine to generally form a housing assembly or enclosure, which contains prodding features 26, at least in substantial part, when movable platform 24 and prodding features 26 reside in the retracted position shown in FIGS. 1-4.

Leading terminal ends 30 of prodding features 26 may assume any form suitable for creating a tactile deterrent effect when engaged into or pressed against an animal. In the illustrated example, specifically, prodding features 26 each assume the form of a pillar or post terminating in a prodding tip. The term "prodding tip," as appearing herein, refers to the terminal end portion of a projection that, when pressed against or otherwise engaged into an animal's coat or skin, creates an unpleasant or aversive tactile sensation. Leading terminal ends 30 of prodding features 26 may be formed by providing prodding features 26 with narrowed terminal ends that are sufficiently pointed to discourage excessive pulling behaviors in at least some animals, while being sufficiently blunt, soft, or compressible to ensure that the animal is not harmed. Various different design parameters can be adjusted to fine-tune or tailor the intensity of the aversive tactile effect created by leading terminal ends 30 of prodding features 26 when engaged into an animal. These factors include, but are not limited to, the sharpness (or bluntness) of the points in which leading terminal ends 30 of prodding features 26 terminate, the heights and Range of Motion (ROM) of prodding features 26, the number and spacing of leading terminal ends 30 of prodding features 26 (generally, the more prodding tips and the more closely spaced the prodding tips, the less the deterrent effect), and the hardness of the material from which leading terminal ends 30 of prodding features 26 are produced.

In further embodiments, leading terminal ends 30 of prodding features 26 may assume other forms suitable for creating the desired tactile deterrent effect when pressed against an animal's exterior. For example, in certain implementations, each prodding tip 46 may terminate in multiple points or may be roughened in some manner. In other embodiments, the tips of prodding features 26 may be produced from a different material or formed as separate pieces (e.g., short lengths of wire) that are attached (e.g., partially embedded) in the post-like bodies of features 26 and project therefrom. As a further possibility, discrete metal tips or caps (e.g., knurled or bluntly pointed) can be attached to the terminal ends of prodding features 26 utilizing, for example, an adhesive, a threaded interface, or crimping. Additionally or alternatively, prodding features 26 may be configured to converge when engaged into an animal such that a pinching effect is created between neighboring terminal ends 30, as describe more fully below. As a still further possibility, prodding features 26 may constitute a grid of needle-like extensions resembling the metal or plastic bristles of a pet brush in an alternative embodiment. In yet further implementations, prodding features 26 may not assume the form of posts or pillars, but may instead have a different form factor, such as that of one or more elongated ridge or blade-like extensions that terminate in tapered edges, gently-contoured saw toothed edges, or the like. Various other form factors, materials, and dispositions for prodding features 26 are also possible.

To allow sliding movement of prodding features 26 relative to frame 22, a number of openings 38 is provided through forward wall 32 of frame 22. Prodding features 26 project from movable platform 24 and into openings 38, which align with features 26 as taken along prodding axis/centerline 28 and which are imparted with dimensions suitable for permitting prodding features 26 to increasingly emerge therefrom in the manner described below. In the illustrated example wherein anti-pull collar attachment 20 includes two prodding features 26 arranged in a side-by-side relationship or in a longitudinally-spaced row, two openings 38 are provided in forward wall 32 and arranged in a similar longitudinally-spaced row. In other embodiments, a single, relatively large opening may be provided through forward wall 32 of frame 22 or anti-pull collar attachment 20 may include another type of features or structures (e.g., rounded projections at each corner of frame 22) that serve as an animal-contacting guard member, which reduces the pressure applied by prodding features 26 against the animal's exterior when prodding features 26 reside the retracted position shown in FIGS. 1-4.

Several channels or slots 40 are provided in flanges 34 and extend substantially parallel to prodding axis/centerline 28. Slots 40 matingly receive a corresponding number of tabs 42, which are fixedly coupled to (e.g., integrally formed with) movable platform 24 and which extend along axes substantially parallel to the transverse axis of anti-pull collar attachment 20 (orthogonal to axes 28 and 36 and identified in FIG. 4 by double-headed arrow 44). Collectively, slots 40 and tabs 42 form a sliding interface 40, 42, which guides movement of movable platform 24 and, therefore, prodding features 26 along prodding axis 28. Tabs 42 travel within their corresponding slots 40 in flanges 34 as movable platform 24 slides with respect to frame 22 along axis 28. Additional guidance or location of prodding features 26 may also be provided by a close-fitting relationship between features 26 and openings 38 in forward wall 32. As a still further benefit, frame 22 and molded piece 24, 26 can be assembled utilizing a simple snap fit or interference fit approach by pressing tabs 42 into slots 40 during assembly of anti-pull collar attachment 20. This provides a simple, reliable construction lacking fasteners to lower part count and production costs. The outer terminal ends of slots 40 may also serve as hard stop features, which arrest movement of tabs 42 in an aftward direction away from forward wall 32 when movable platform 24 moves into the retracted position shown in FIGS. 1-4.

Figure 7:
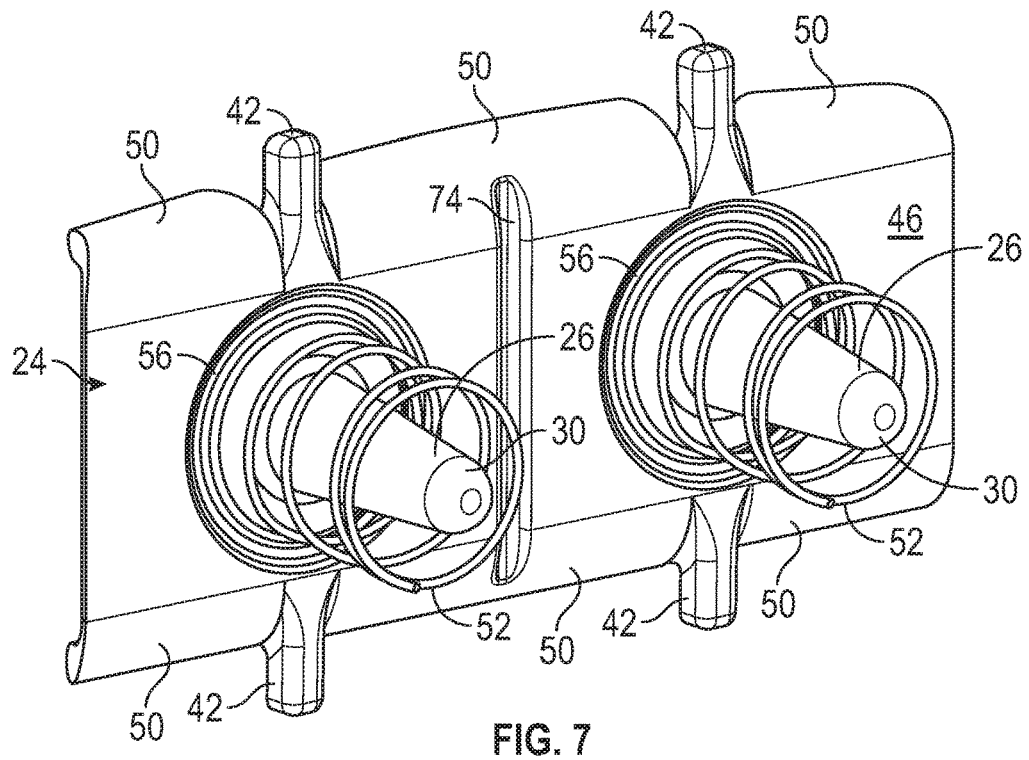
FIG. 7 is a front isometric view of a movable platform, two springs, and two prodding features, which are further included in the anti-pull collar attachment shown in FIGS. 1-5.

FIG. 7 illustrates movable platform 24 in isolation, as seen from a front isometric view. Two coil springs 52 can also be seen in FIG. 7 and are described more fully below. Referring to FIG. 7 in conjunction with FIGS. 1-6, the body of movable platform 24 assumes the form of a relatively thin, longitudinally-elongated strip or wall having an animal-facing side 46 and a collar-facing side 48; the terms "animal-facing" and "collar-facing" utilized in reference to the orientation of the sides of movable platform 24 when installed on an animal-worn collar. Animal-facing side 46 and collar-facing side 48 may also be considered the "forward" and "aft" sides or principal surfaces of movable platform 24, respectively. Prodding features 26 extend from animal-facing side 46 into openings 38 provided forward wall 32 of frame 22. As indicated above, two prodding features 26 are arranged in a row and spaced along the longitudinal axis 36 of anti-pull collar attachment 20 (FIG. 3) in the illustrated embodiment. In further embodiments, anti-pull collar attachment 20 can include a single prodding feature or more than two prodding features, which can be distributed in various different spatial arrangements. Frame 22 further includes a number of collar guide rails 50, which extend from the longitudinal edges of collar-facing side 48 in a rearward or aftward direction away from animal-facing side 42. Collar guide rails 50 help retain a segment of a collar in its desired position when routed or passed through the collar attachment interface of movable platform 24, as described below in conjunction with FIGS. 8 and 9.

Figure 4:
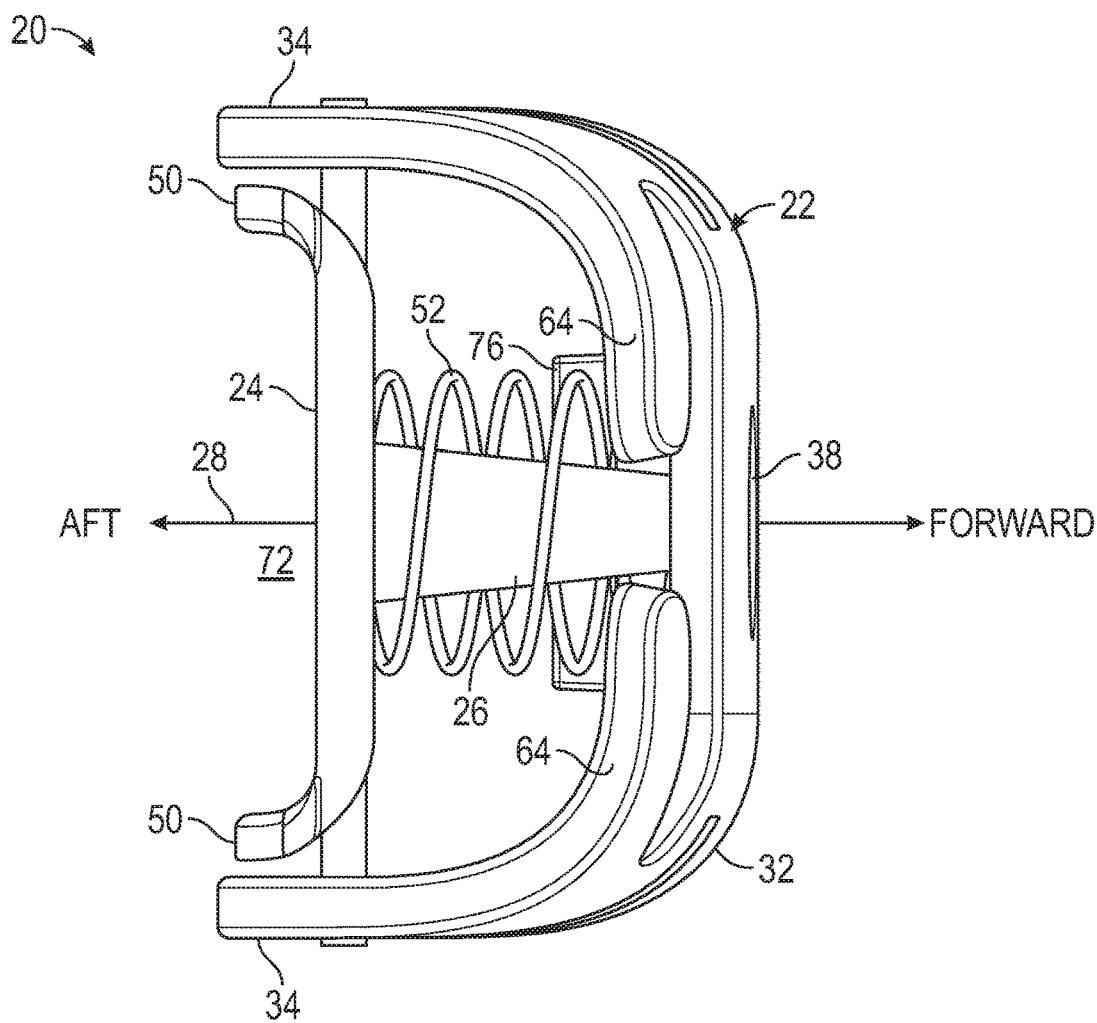

As best shown in FIGS. 4 and 7, anti-pull collar attachment 20 further contains two coil springs 52, which resiliently bias movable platform 24 and prodding features 26 toward the retracted position (FIGS. 1-4). Springs 52 are captured and compressed between the interior surfaces of frame 22 and movable platform 24. More specifically, a first end of each coil spring 52 abuts a first spring seat 54 (identified in FIG. 6) formed in the backside of forward wall 32 of frame 22 and around one of openings 38. The second, opposing end of each coil spring 52 abuts a second spring seat 56 (identified in FIG. 7) formed in movable platform 24 around a base portion of one of prodding features 26. Coil springs 52 also extend around and are substantially coaxial with prodding features 26, which further help retain springs 52 in their desired position. Coils springs 52 extend around or circumscribe prodding features 26 in the illustrated example, with each prodding feature 26 extending through a different spring 52. Coil springs 52 are sized and preloaded to at least partially set the force required to transition movable platform 24 (and therefore prodding features 26) from the fully retracted position (FIGS. 1-4) to the fully extended position (FIG. 5). In further embodiments, movable platform 24 can be biased toward the retracted position (FIGS. 1-4) in a different manner, such as by molding or otherwise producing frame 22 to include one or more spring fingers (resilient flexures), which contact movable platform 24 to impart the desired bias force.

Anti-pull collar attachment 20 further includes a collar attachment interface, which is coupled to frame 22 and may be integrally formed therewith in whole or in part. The collar attachment interface permits frame 22 and, more generally, anti-pull collar attachment 20 to be removably mounted to an animal collar by a user as a retrofit attachment. The collar attachment interface can include any type, number, and combination of features (generically referred to herein as "collar mount features") suitable for providing this function. The collar mount features are usefully, but not necessarily coupled to (e.g., attached to or integrally formed with) opposing end portions of frame 22. In particular, a first collar mount feature may be coupled to a first end of frame 22, while a second collar mount feature may be coupled to an opposing end of frame 22 such that the collar mount features are located adjacent opposing end portions of movable platform 24, as taken along longitudinal axis 36 (FIG. 3). In some implementations, the collar mount features can include or assume the form of openings formed in frame 22, platform 24, or another structure through which a segment or section of a strap collar can be routed or passed, as described more fully below in conjunction with FIGS. 8 and 9.

In certain embodiments, the collar attachment interface may include flexible collar mount features, which are attached to frame 22 and which can be fastened around an animal collar utilizing buckles, snaps, straps, hook-and-loop fasteners, buttons, clasps, ties, cord locks, resilient bands, or the like. Advantageously, such collar mount features can be utilized to fasten frame 22 and, more generally, anti-pull collar attachment 20 to a wide variety of animal collars including chain collars. Alternatively, the collar attachment interface may include clips or hooks (e.g., resilient plastic or metal clips molded into or affixed to the body of frame 22) similar to belt clips, which are suitable for clipping anti-pull collar attachment 20 onto an animal collar. As a still further possibility, the collar attachment interface of anti-pull collar attachment 20 can assume the form of a slider-type attachment interface of the type described below. Generally, then, the collar attachment interface can include any combination of structural features suitable for removably mounting collar attachment 20 to an animal collar. In some cases, convenience of use may be enhanced by providing a collar attachment interface permitting anti-pull collar attachment 20 to be threaded onto, clipped onto, or otherwise attached to an animal collar without requiring removal of the collar from the animal.

In the exemplary embodiment shown in FIGS. 1-7, anti-pull collar attachment 20 includes a collar attachment interface 58, 60. Collar attachment interface 58, 60 includes, in turn, a collar guideway through which a segment of an animal collar is routed or passed to mount anti-pull collar attachment 20 to the animal collar. Collar attachment interface 58, 60 includes two collar mount features or "collar guide" ports 58 and 60, which are spaced along longitudinal axis 36 of collar attachment 20. Collar guide ports 58 and 60 are formed in laterally-opposed sides of frame 22 of collar attachment 20 such that movable platform 24 and prodding features 26 are located between guide ports 58 and 60, as taken along longitudinal axis 36 (FIG. 3). In the illustrated example, collar guide ports 58 and 60 are slider-type features, which each include a main opening 62 through which a strap segment of an animal collar can be routed. Additionally, collar guide ports 58 and 60 each include two retention arms 64, which border and define openings 62. At their outer terminal ends, each pair of retention arms 64 is separated by an open slot 65, which connects to a corresponding opening 62. When mounting anti-pull collar attachment 20 to an animal collar, a segment of the animal collar can be inserted into main openings 62 through open slots 65 by a user with relative ease and without requiring removal of the collar from an animal. Open slots 65 are chosen to have a width less than the width of collar, while main openings 62 are imparted with widths equal to or greater than the width of the collar. To install collar attachment 20, a user gently twists a segment of the collar as he or she inserts the collar segment through open slots 65. The collar segment is then untwisted and retained within wider main openings 62 by contact with retention arms 64. In this manner, a user may simply slip or press anti-pull collar attachment 20 onto an animal collar currently worn by the animal at the desired time of use.

Figure 8:
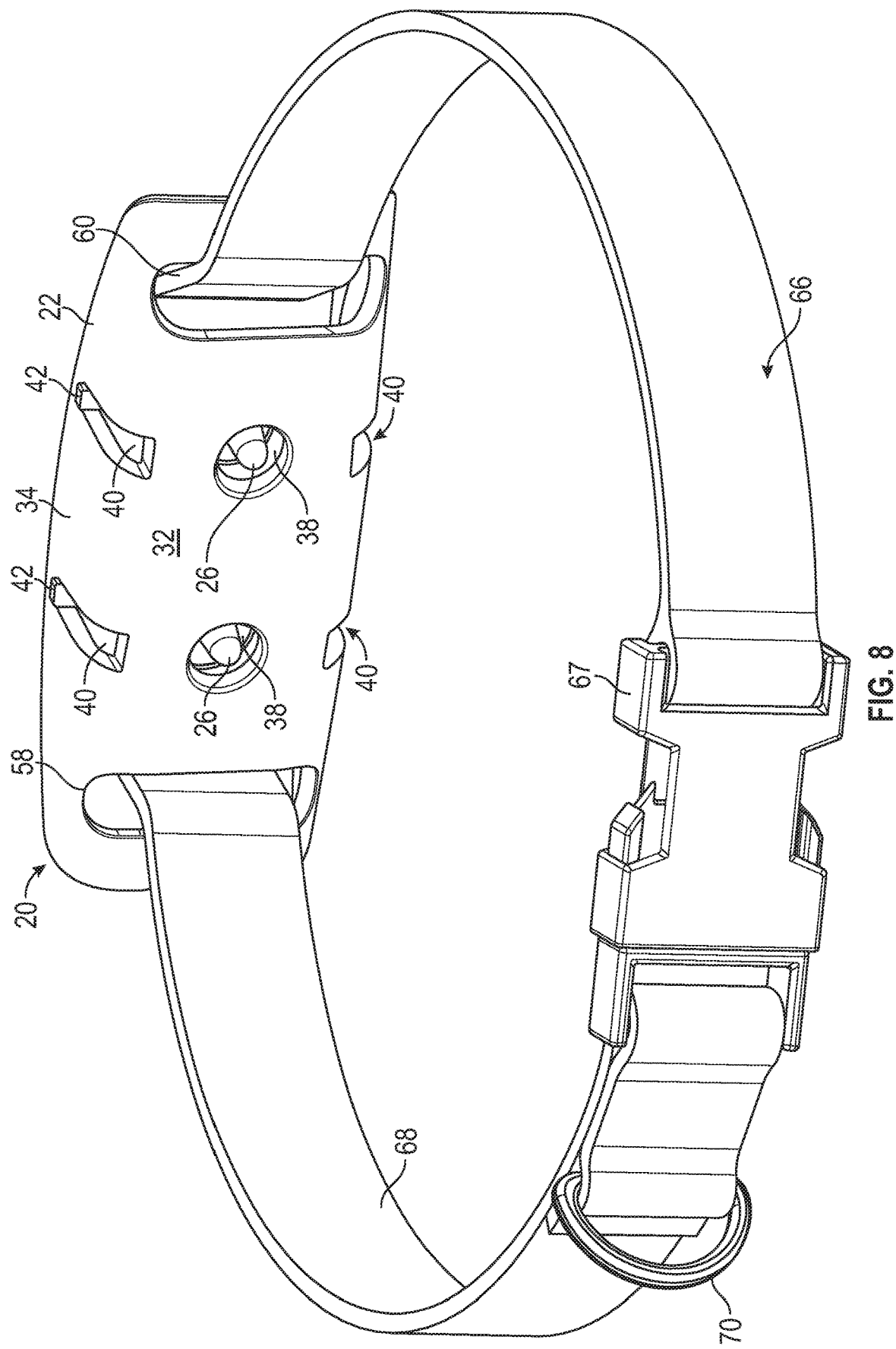
FIGS. 8 and 9 are isometric views illustrating an exemplary manner in which the anti-pull collar attachment shown in FIGS. 1-5 can be removably attached to an animal collar, such as a dog collar.
Figure 9:
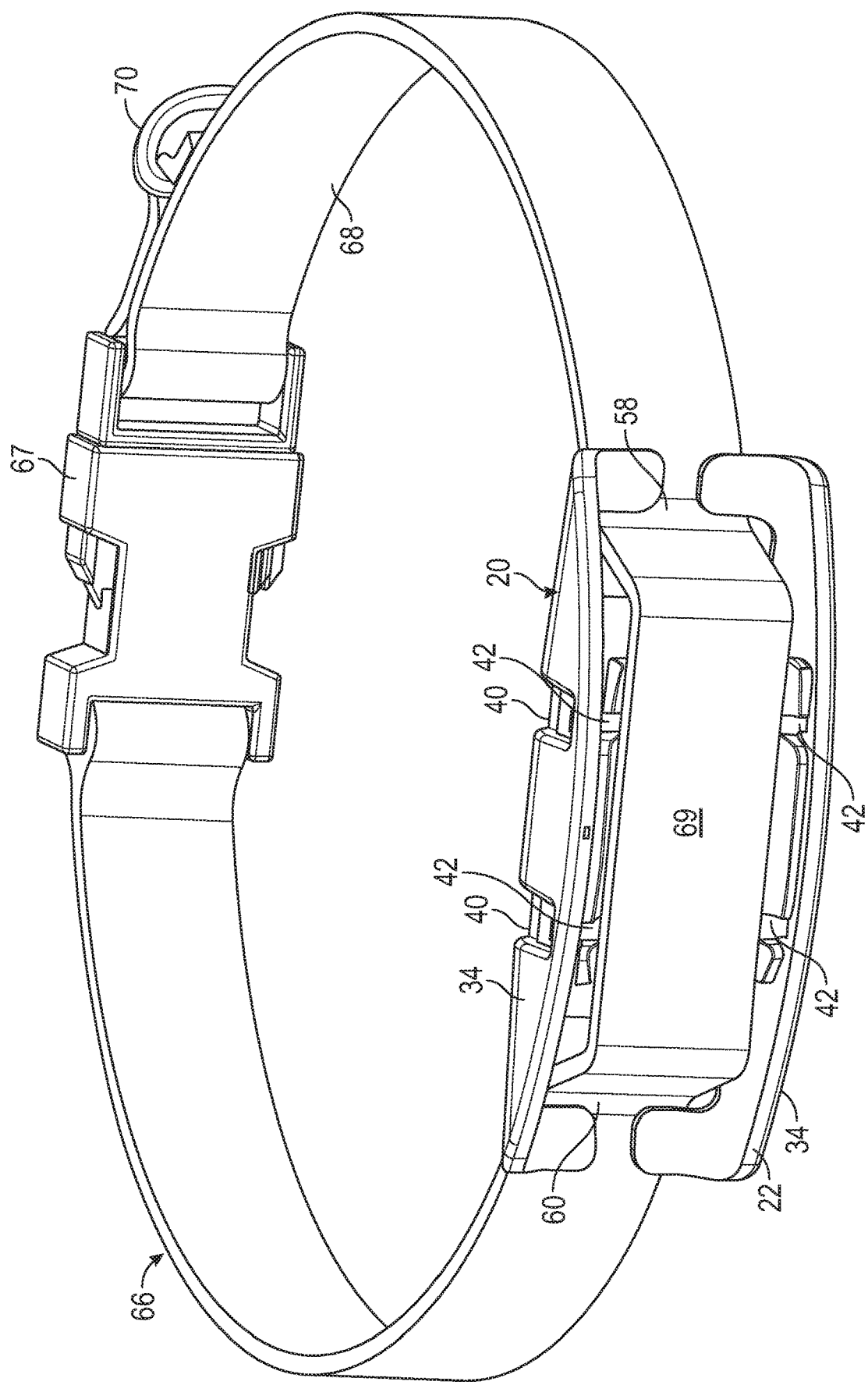

FIGS. 8 and 9 illustrate anti-pull collar attachment 20 after installation on a generalized collar 66 including a looped band or strap 68, the free ends of which terminate in and are selectively joined by a buckle 67. In mounting anti-pull collar attachment 20 to collar 66, a segment 69 of collar 66 (identified in FIG. 9) is routed or passed through collar attachment interface 58, 60. The path traveled by strap segment 69 of collar 66 thus generally corresponds to or demarcates the collar guideway of collar attachment interface 58, 60 in the illustrated example. When progressing through collar attachment interface 58, 60, segment 69 of collar 66 extends through collar guide port 58 provided in a first end portion of frame 22 (thereby entering anti-pull collar attachment 20); across collar-facing side 40 of movable platform 24 (thereby contacting collar-facing side 40); and through collar guide port 60 provided in a second, opposing end portion of frame 22 (thereby exiting collar attachment 20). In this manner, movable platform 24 and prodding features 26 are positioned substantially interior to collar 66 when anti-pull collar attachment 20 is installed thereon. Stated differently, anti-pull collar attachment 20 locates prodding features 26 and the majority of movable platform 24 underneath segment 69 of collar 66 when collar attachment 20 is installed on collar 66. Prodding features 26 are thus positioned or located between the inner circumferential surface of collar 66 and the animal wearing collar 66, as taken along prodding axis 28.

Anti-pull collar attachment 20 further includes a shallow trench or open channel 72 (identified FIG. 4), which opens in an aftward or rearward direction and which is defined by or longitudinally bordered by collar guide rails 50. Open channel 72 extends longitudinally across collar-facing side 46 of movable platform 24 and partially across the backside of anti-pull collar attachment 20 from collar guide port 58 to collar guide port 60. Open channel 72 receives strap segment 69 when collar attachment 20 is installed on collar 66. Thus, in conjunction with collar guide ports 58 and 60, open channel 72 largely defines the collar guideway of collar attachment interface 58, 60. The dimensions of collar guide port 58, collar guide port 60, and channel 72 (particularly, the respective widths of these features, as taken along a transverse axis perpendicular to axes 36 and 44) may be selected to accommodate a wide range of strap collars. For example, in one embodiment, the average width of open channel 72 may be selected to be between about 1 inch and about 2 inches such that collar attachment 20 may accommodate 1 inch wide collars, as well as other common collar widths below 1 inch, such as collars having widths of 0.75 inch and 0.5 inch. In other embodiments, open channel 72 may have an average width that is greater than or less than the aforementioned range. The average widths of collar guide ports 58 and 60 may be slightly greater than the width of open channel 72.

When the collar bearing anti-pull collar attachment 20 is not subject to pulling by a dog or other animal, little to no compressive force is exerted across collar attachment 20, as taken along prodding axis 28. In this case, collar attachment 20 (particularly, prodding features 26) remains in the retracted position shown in FIGS. 1-4. Conversely, when the collar bearing anti-pull collar attachment 20 is subject to a pulling force, a compressive force is exerted through collar attachment 20 between frame 22 and movable platform 24 (and, particularly, between forward wall 32 contacting the animal and collar-facing side 48 of movable platform 24 contacting the inner circumferential surface of the animal-worn collar). When this compressive force is sufficient to overcome the spring bias force exerted on movable platform 24 by springs 52, movable platform 24 and prodding features 26 slide toward forward wall 32 of frame 22 along prodding axis 28 (FIG. 4) and prodding features 26 increasingly emerge from openings 38. Thus, the greater the pull force exerted by the animal through the collar, the greater the intensity of the localized pressure applied by prodding features 26 against the animal. A proportional deterrent effect is thus created, which may increase the effectiveness of collar attachment 20 in training an animal to avoid excessive pulling behaviors.

In certain embodiments of anti-pull collar attachment 20, prodding features 26 may be fully received or recessed within frame 22 when in the retracted position shown in FIGS. 1-4. In this case, prodding features 26 may be pressed against the animal only when excessive pulling occurs. Specifically, leading terminal ends 30 of prodding features 26 may be fully retracted into or recessed within openings 38 and may not engage an animal when in the retracted position (FIGS. 1-4). Alternatively, anti-pull collar attachment 20 may be designed such that leading terminal ends 30 of prodding features 26 continue to project from openings 38 when movable platform 24 resides in the retracted position (FIGS. 1-4), but to a lesser extent than when movable platform 24 and prodding features 26 transition into the extended position shown in FIG. 5. In such embodiments, forward wall 32 of frame 22 is placed in physical contact with an animal wearing animal collar 66 and provides a relatively large animal-contacting surface area reducing the local pressure applied to the animal by prodding features 26 when in the retracted position (FIGS. 1-4). The term "guard member" is generally utilized herein to refer to such features or structures, which contact an animal when the prodding features are in a non-engaged (e.g., retracted and/or non-pinching position) to eliminate or reduce the intensity of the aversive effect (as compared to the intensity of the aversive effect when collar attachment 20 is actuated or triggered). The leading fascia of anti-pull collar attachment 20 and, specifically, forward wall 32 may thus be generically referred to as a "guard member," relative to which prodding features 26 advance when collar attachment 20 is actuated. In further embodiments, anti-pull collar attachment 20 may not include such a guard member.

If desired, anti-pull collar attachment 20 can provide a multistage deterrent response to pulling behaviors, which intensifies in a stepwise fashion as a pull force exerted through a collar and the corresponding compressive force applied across collar attachment 20 increases. For example, in one implementation, anti-pull collar attachment 20 may include prodding features in the form of posts, which vary in length or height as taken along prodding axis 28. In such embodiments, the longer posts (or post) may terminate in relatively blunt or rounded tips, while the shorter posts (or post) terminate in less blunt or pointed tips. The relatively blunt, longer posts may thus initially contact the animal in the presence of a minimum pull force, while the shorter posts do not initially engage the animal to provide a less pronounced aversive effect. As the pull force increases in intensity, the shorter, less blunt posts may then engage into the animal to generate an intensified aversive effect. In other embodiments, the anti-pull collar attachment may provide a multi-stage deterrent effect in a different manner. For example, and as explained more fully below, anti-pull collar attachment 20 may be configured to provide a two stage deterrent effect by initially prodding an animal in response to a moderate pull force, as described above; and by further prodding and simultaneously exerting a pinch effect in response to a further increase in the pull force exerted on the animal collar bearing anti-pull collar attachment 20 and, therefore, a corresponding increase in the compressive force exerted across collar attachment 20.

With continued reference to the exemplary embodiment shown in FIGS. 1-9, and as seen most readily in FIGS. 5 and 7, movable platform 24 is produced to include a central hinge region 74; e.g., movable platform 24 may be molded to include a thinned region serving as a living hinge, which facilitates bending or deflection of platform 24 around a hinge line orthogonal to axes 28 and 36. Additionally, frame 22 is produced to include an internal stop feature 76 (shown most clearly in FIGS. 5 and 6), which may assume the form of an internal ridge extending aftward of front wall 32 and aligning with hinge region 74 as taken along prodding axis 28. As movable platform 24 slides toward forward wall 32 of frame 22, hinge region 74 moves toward internal stop feature 76. At a juncture prior to movable platform 24 and prodding feature 26 reaching the fully extended position (FIG. 5), hinge region 74 contacts internal stop feature 76. If the pull force exerted through anti-pull collar attachment 20 continues to increase, the strap segment of the animal collar routed through collar guide ports 58 and 60 exert a compressive force at the outer lateral regions of movable platform 24. This causes movable platform 24 to flex or fold along hinge region 74 and prodding features 26 to rotate or converge toward one another. A pinching motion is thus created between leading terminal ends 30 of prodding features 26, as indicated in FIG. 6 by convergent arrows 78. Such a pinching action taken in combination with the poking sensation generated by further extension of prodding features 26 may help discourage aggressive pulling behavior when the initial extension of prodding features 26 without a pinching effect did not. The effectiveness of anti-pull collar attachment 20 may be increased as a result.

In further embodiments, the above-described pinching effect may be created in another manner, such as by angling prodding features 26 toward one another and imparting features 26 with a controlled flexibility such that features 26 bend inwardly to converge when pressed into an animal. In this case, it may be desirable to produce prodding features 26 and movable platform 24 as a metal piece, which is stamped and formed or otherwise produced to include the features described above or other features. Prodding features 26, in particular, can be produced as tabs or finger-like extensions cut into the metal plate and then bent outward to create two (or more) prodding features, which flex toward one another when depressed to produced the desired pinching effect. In still further embodiments, anti-pull collar attachment 20 may not generate such a pinching effect or may solely generate such a pinching effect (rather than a poking effect) when actuated or triggered.

In certain embodiments, it may be desirable to impart anti-pull collar attachment 20 with features providing feedback or notification to a user as collar attachment 20 is actuated. This user-perceptible feedback can be audible or tactile and transmitted through a collar and leash. For example, in one embodiment, one or more surfaces of the sliding interface 40, 42 formed between tabs 42 and slots 40 may be intentionally roughed or ribbed such that an audible vibrational effect is generated as movable platform 24 slides with respect to frame 22 along prodding axis 28. In this manner, movable platform 24 and frame 22 may combine to form a feedback interface, which generates at least one of a user-perceptible sound and a user-perceptible vibrational response as platform 24 moves along prodding axis 28. One possible location for such a roughened or ribbed surface is generically represented in FIG. 2 by dot stippling. In testing, it has been found that such a vibrational effect is both audible to a user and perceptible by feel through a leash and collar to allow a user to better gauge when anti-pull collar attachment 20 is triggered and, thus, whether collar attachment 20 is providing the desired deterrent effect.

In further embodiments, anti-pull collar attachment 20 may be configured to generate tactile and/or audible feedback in another manner, possibly by generating a soft clicking noise or chime when platform 24 and prodding features 26 approach the fully extend, pinching position shown in FIG. 5. In further embodiments, anti-pull collar attachment 20 may not generate any such user-perceivable feedback. Finally, anti-pull collar attachment 20 can potentially include various electronic features or devices for noise generation, for haptic response, and/or for generating a desired deterrent effect (e.g., electrical pulses) in certain embodiments. It may be advantageous (although it is not essential), however, that anti-pull collar attachment 20 is purely mechanical in design and lacks any such electronic devices, power sources, wiring, or the like, which may otherwise add undesired cost, complexity, and fragility to the construction of collar attachment 20.

There have thus been described embodiments of an anti-pull collar attachment, which can be removably attached to an animal collar by a user, such as a pet owner, to discourage an animal wearing the collar from engaging in excessive pulling behaviors. In contrast to many conventional anti-pull training devices, the anti-pull collar attachment can be freely installed on and removed from a variety of collars on an as-needed basis; e.g., a dog owner may attach the anti-pull collar attachment to a collar currently worn by his or her dog immediately prior to taking the dog on a walk and subsequently remove the collar attachment after the walk concludes. In certain embodiments, the anti-pull collar attachment may include one or more prodding features, which produce a prodding (poking and/or pinching) effect to discourage the animal from engaging in excessive pulling behaviors. Specifically, the prodding features may deploy to generate an unpleasant or aversive tactical effect when a sufficient compressive force is exerted across the anti-pull collar attachment due to pulling on the animal collar bearing the collar attachment. In this manner, the above-described collar attachment may serve as a convenient and effective anti-pull training aid for dogs and other animals.

In one group of embodiments, the anti-pull collar attachment includes an outer housing or frame and a collar attachment interface, which is coupled to the frame. The collar attachment interface has a collar guideway through which a segment of an animal collar is routed or passed to attach the anti-pull collar attachment to the animal collar. A first prodding feature is movably coupled to the frame in, for example, a sliding relationship. The first prodding feature projects from the frame in a forward direction and is located forward of the collar guideway such that the first prodding feature is positioned underneath the animal collar when routed through the collar guideway. In certain embodiments, the anti-pull collar attachment also includes a movable platform, which is coupled to the frame and which is slidable with respect thereto along a prodding axis. In such embodiments, the prodding feature may project from the movable platform and move in conjunction therewith along the prodding axis. Additionally, the frame may include a forward wall placed in contact with an animal wearing the animal collar to which the anti-pull collar attachment is mounted, and the first prodding feature may advance relative to the forward wall as the movable platform and the first prodding feature move along the prodding axis in a forward direction.

In other embodiments, the anti-pull collar attachment includes a movable platform having a collar-facing side and an animal-facing side opposite the collar-facing side. Prodding features project from the collar-facing of the movable platform in a forward direction. A collar attachment interface is configured to permit a user to attach the anti-pull animal collar attachment to an animal collar such that: (i) at least a portion of the movable platform is positioned underneath or interior to the animal collar, and (ii) the prodding features extend from the movable platform toward an animal wearing the animal collar. The movable platform and prodding features are movable with respect to the collar attachment interface along a prodding axis, which is substantially perpendicular to a longitudinal axis of the collar attachment.

In another group of embodiments, the anti-pull collar attachment includes a collar attachment interface having a collar guideway through which a segment of an animal collar is routed to removably mount the collar attachment to the animal collar. A first prodding feature is coupled to the collar attachment interface and, when the anti-pull collar attachment is removably mounted to the animal collar, is positioned beneath the segment of the animal collar routed through the collar guideway such that the first prodding feature presses into an animal wearing the animal collar when a pull force is exerted thereon. In certain implementations, the anti-pull collar attachment may also include a frame coupled to the collar attachment interface, as well as a movable platform coupled to the frame and slidable with respect thereto along a prodding axis. In such implementations, the first prodding feature may project from the movable platform and move in conjunction therewith along the prodding axis; the movable platform may be movable relative to the frame between a retracted position and an extended position; and the frame may include an animal-contacting wall having an opening through which the first prodding feature advances as the platform moves from the retracted position toward the extended position.

In alternative embodiments, the anti-pull collar attachment includes a housing (e.g., the combination of frame 22 and movable platform 24 shown in FIGS. 1-9) configured to be removably attached to an animal collar and having at least one aperture therein. At least one engagement device is resiliently coupled to the housing for movement through the at least one aperture to engage an animal wearing the animal collar. In certain cases, the at least one engagement device comprises a row of prodding features spaced along a longitudinal axis of the anti-pull collar attachment interface. The anti-pull collar attachment may also include a movable platform from which the row of prodding features projects and which is movable with respect to the housing along a prodding axis. A first collar attachment feature may be provided adjacent a first end portion of the platform, as taken along the longitudinal axis; and a second collar attachment feature located adjacent a second, opposing end portion of the platform, as taken along the longitudinal axis. The first and second collar attachment features may permit a user to removably attach the anti-pull animal collar attachment to the animal collar, while the animal collar is worn by an animal.

In still further embodiments, the anti-pull collar attachment may include a collar attachment interface and an animal-contacting guard member (e.g., forward wall 32 of frame 22), which is placed in contact with an animal when the anti-pull collar attachment is mounted to an animal collar worn by the animal via the collar attachment interface. A first prodding feature is coupled to the collar attachment interface and is movable with respect to the animal-contacting guard member along a prodding axis between a retracted position and an extended position. The first prodding feature advances forward of the animal-contacting guard member (that is, toward an animal wearing the collar on which the collar attachment is installed) as the first prodding feature moves from the retracted position toward the extended position. When advancing forward, the first prodding feature presses against an area of the animal to generate a tactile deterrent effect when a minimum pull force is exerted through the animal collar and a corresponding compressive force is applied across the collar attachment. In one implementation, the anti-pull collar attachment may further include a frame having a leading wall defining the animal-contacting guard member, and, perhaps, a movable platform coupled to the frame and slidable with respect thereto along the prodding axis. The first prodding feature may project from the movable platform in a forward direction. In another implementation, the frame may have a substantially U-shaped geometry, as viewed along a longitudinal axis perpendicular to the prodding axis, and the movable platform may be at least partially housed within, nested within, or surrounded by the frame.

In a yet further embodiment, the anti-pull collar attachment includes a collar guideway through an animal collar is routed to attach the anti-pull collar attachment to the animal collar. The anti-pull collar attachment further includes a movable platform and a first prodding feature. The movable platform has a collar-facing side and an animal-facing side opposite the collar-facing side. The animal collar extends over the collar-facing side of the movable platform when routed or passed through the collar guideway. The first prodding feature projects from the animal-facing side of the movable platform in a direction substantially opposite the collar-facing side thereof. During usage of the anti-pull collar attachment, the first prodding feature presses against or into an area of the animal to generate a tactile deterrent effect when a minimum pull force is exerted through the animal collar and a corresponding compressive force is applied across the anti-pull collar attachment. Finally, in some embodiments, the anti-pull collar attachment may further comprise a plurality of prodding features in which the first prodding features is included, with the plurality of prodding features projecting from the movable platform and moving in conjunction from the retracted position toward the extend portion when a pull force is exerted through the animal collar. In such embodiments, a plurality of springs may be positioned around the plurality of prodding features and compressed between the movable platform and the frame to bias the movable platform and the plurality of prodding features toward the retracted position.

While multiple exemplary embodiments have been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended Claims.

What is claimed is:

1. An anti-pull collar attachment, comprising:
   a frame having a longitudinal axis, the frame comprising:
   a forward wall;
   flanges joined to the forward wall and imparting the frame with a substantially U-shaped geometry when viewed along the longitudinal axis; and
   slots formed in the flanges;
   a movable platform coupled to the frame, the movable platform slidable relative to the movable platform along a prodding axis;
   tabs extending from the movable platform into the slots, the tabs traveling within the slots as the movable platform slides with respect to the frame along the prodding axis;

a prodding feature projecting from the movable platform and moving in conjunction with the movable platform along the prodding axis; and a collar attachment interface through which a segment of an animal collar is routed to removably mount the anti-pull collar attachment to the animal collar.

2. The anti-pull collar attachment of claim 1 further comprising an open channel extending across a backside of the movable platform and opening in an aft direction away from first prodding feature.

3. The anti-pull collar attachment of claim 1 wherein the tabs are integrally formed with the movable platform as a single molded piece.

4. The anti-pull collar attachment of claim 1 wherein the movable platform is nested within the frame such that the frame surrounds the movable platform on three sides.

5. The anti-pull collar attachment of claim 1 wherein the collar attachment interface comprises:

pairs of retention arms formed in opposing end portions of the frame, the pairs of retention arms at least partially defining collar guide ports through which the segment of the animal collar is routed to removably mount the anti-pull collar attachment to the animal collar; and additional slots separating terminal ends of the pair of retention arms, the additional slots connecting to the openings to facilitate insertion of the segment of the animal collar into the collar guide ports.

6. The anti-pull collar attachment of claim 1 wherein the movable platform is movable relative to the frame between a retracted position and an extended position; and wherein the forward wall comprises an opening through which the prodding feature advances as the movable platform moves from the retracted position toward the extended position.

7. The anti-pull collar attachment of claim 1 wherein the movable platform comprises:

an animal-facing side from which the prodding feature projects in a forward direction; and a collar-facing side partially across which the segment of the animal collar extends when routed through the collar attachment interface such that the prodding feature is positioned beneath the animal collar when the anti-pull collar attachment is removably mounted to the animal collar.

8. The anti-pull collar attachment of claim 1 further comprising a spring compressed between an inner surface of the frame and the movable platform, the spring biasing the movable platform and prodding feature to move along the prodding axis in an aft direction.

9. The anti-pull collar attachment of claim 1 wherein the prodding feature terminates in a prodding tip, which engages into an area of the animal as a compressive force is applied across the anti-pull collar attachment.

10. The anti-pull collar attachment of claim 1 wherein the prodding feature is included in a plurality of prodding features integrally formed with the movable platform as a molded piece.

11. The anti-pull collar attachment of claim 1 wherein the movable platform further comprises collar guide rails projecting from a collar-facing side of the movable platform in the aft direction and bordering the open channel extending across the backside of the movable platform.

12. An anti-pull collar attachment, comprising:

a frame;

a movable platform coupled to the frame for sliding movement with respect to the frame;

prodding features projecting from the movable platform in a forward direction, the prodding features moving in conjunction with the movable platform between a retracted position and an extended position;

a central hinge region formed in the movable platform, the central hinge region facilitating bending of the movable platform and convergent movement of outer tips of the prodding features as the prodding features move from the retracted position into the extended position; and a collar attachment interface through which a segment of an animal collar is routed to removably mount the anti-pull collar attachment to the animal collar.

13. The anti-pull collar attachment of claim 12, wherein the frame comprises an internal stop feature positioned to contact the central hinge region of the movable platform as the prodding features move from the retracted position into the extended position.

14. The anti-pull collar attachment of claim 12 further comprising an open channel extending across a backside of the movable platform and opening in an aft direction away from the prodding features.

15. The anti-pull collar attachment of claim 12 further comprising:

slots formed in the frame; and tabs extending from the movable platform into the slots, the tabs traveling within the slots as the movable platform slides with respect to the frame.

16. The anti-pull collar attachment of claim 15 wherein the tabs are integrally formed with the movable platform as a single molded piece.

17. The anti-pull collar attachment of claim 15 wherein the movable platform is nested within the frame such that the frame surrounds the movable platform on three sides.

18. The anti-pull collar attachment of claim 15 wherein the collar attachment interface comprises:

pairs of retention arms formed in opposing end portions of the frame, the pairs of retention arms at least partially defining collar guide ports through which the segment of the animal collar is routed to removably mount the anti-pull collar attachment to the animal collar; and slots separating terminal ends of the pair of retention arms, the slots connecting to the openings to facilitate insertion of the segment of the animal collar into the collar guide ports.

* * * * *